United States Patent [19]

Andre et al.

[11] 4,357,401

[45] Nov. 2, 1982

[54] MACROMOLECULAR MATERIAL OF IONIC CONDUCTION

[75] Inventors: Jean D. Andre; Andreas Killis; Jean-Francois Le Nest, all of Grenoble; Herve M. Cheradame, La Tronche, all of France

[73] Assignee: L'Etat Francais represente par le Delegue General pour l'Armement, Paris, France

[21] Appl. No.: 249,940

[22] Filed: Apr. 1, 1981

[30] Foreign Application Priority Data

Mar. 31, 1980 [FR] France ............................... 80 07135

[51] Int. Cl.³ ............................................. H01M 6/18
[52] U.S. Cl. ................................... 429/192; 429/199

[58] Field of Search ................ 429/192, 199, 33, 213; 204/195 S; 252/62.2

[56] References Cited

U.S. PATENT DOCUMENTS 3,551,211 12/1970 Grulke ................................ 429/192
3,764,385 10/1973 Langer, Jr. .......................... 429/105

Primary Examiner—Anthony Skapars
Attorney, Agent, or Firm—Stevens, Davis, Miller & Mosher

[57] ABSTRACT

A solid electrolyte formed of a cross-linked elastomeric complex material charged with one or more ionizable salts of high ionic conduction.

9 Claims, No Drawings

MACROMOLECULAR MATERIAL OF IONIC CONDUCTION

The present invention relates to a solid electrolyte, and more particularly to a solid electrolyte formed of a cross-linked elastomeric complex material which provides good ionic conductivity and has satisfactory mechanical properties.

The aqueous solutions conventionally used as electrolytes in various devices such as storage batteries have the drawback of resulting in degradation and are difficult to handle. Thus, solid electrolytes have been developed which have a certain number of advantages, including thermal stability, absence of corrosion of the electrodes, limitation of the dentritic growth upon recharging, and a wide range of redox stability which permits their combination with highly energizing couples and to obtain electrochemical generators of high energy per unit of weight. Furthermore, the solid electrolytes can be prepared in thin layers which makes it possible to decrease the internal resistance of the generators.

However, up to now, solid electrolytes consisting of macromolecular materials of ionic conduction which provide satisfactory properties such as to permit their use in practice have not been developed, due in particular to the slight possibilities of displacement of the metal ions such macromolecular networks. If has been attempted to overcome this drawback by preparing membranes which are swollen by a solvent of high dielectric constant, assuring the solvation of the ions and permitting their displacement in the network. However, while the ionic conductivity is improved, the mechanical properties remain poor and make such membranes unusable.

French Pat. No. 2,032,949 relates to a dry cell containing an adhesive polymer which establishes an ionic conduction between the anode and the cathode mass and which may in one embodiment play the role of an electrolyte. The adhesives used are selected from among stable and conductive adhesive polymeric materials; cited are the reaction products of polyacrylamide, urea, and acetamide containing an aqueous solution of zinc chloride and ammonium chloride.

This patent is not concerned with the improvement of the conductivity; the polymeric electrolytes cited therein have a structure different from those of the present invention since they consist of a non-cross-linked polymer and an aqueous solution of a salt.

French Pat. No. 2,442,513 describes electrolytes consisting of solid solutions of ionic compositions dissolved within a macromolecular plastic material comprising homo- and/or co-polymers essentially with non-cross-linked chains, derived from one or more monomers comprising a heteroatom. In contrast with the polymers of this invention, these of the above patent are not cross-linked; all the examples mentioned therein make reference to non-cross-linked polymers.

U.S. Pat. No. 3,551,221 describes an electrolytic composition for use in dry batteries, consisting of a polymer of which the chain comprises radicals containing at least one atom capable of forming a hydrogen bond and at least one hydrogen atom capable of participating in the hydrogen bond. The radicals have a length and a geometrical configuration such that each of them may form at least one hydrogen bond with the adjacent radical. It is indicated that the preferred materials have a structure such that there is no possibility of cross-linking, whereas the polymers utilized in this invention are cross-linked. Finally, conductivity is insured by H+ions.

U.S. Pat. No. 3,764,385 describes conductive complexes formed between salts of lithium and chelating agents consisting of tertiary amines containing at least two nitrogen atoms, monomeric or polymeric, in the presence of a solvent.

In the absence of a solvent, the complex should be utilized in a molten state; therefore these complexes are fundamentally different from those of the present invention which are solid, cross-linked materials.

The object of the present invention is a cross-linked elastomeric complex material charged with one or more ionizable salts of high ionic conduction which can be used as solid electrolyte of excellent ionic conductivity and good mechanical properties.

Another object of the invention is a solid electrolyte consisting of a cross-linked membrane charged with one or more ionizable salts of high ionic conduction in the absence of water or any other solvent, in which the macromolecular network itself assures the solvation role and permits the displacement of the ions.

Finally, another object of the invention is a cross-linked elastomeric complex material charged with one or more ionizable salts having a very low glass transition temperature and retaining a sufficient modulus of elasticity at the operating temperature.

The solid electrolyte in accordance with the present invention consists of a cross-linked macromolecular material having a base of polymers or oligomers containing heteroatoms in the monomer unit or in side chains as well as cross-linkable functions containing one or more ionizable salts and presenting a glass transition temperature as low as possible.

The polymers or oligomers used in the invention which upon cross-linking form the macromolecular material of ionic conduction are sequenced or grafted statistical copolymers or sequenced or grafted copoly-condensates derived from cyclic ethers, formaldehyde, acetaldehyde, aziridines or ethylenediamine. These copolymers or oligomers, used alone or in combination, have functions which are cross-linkable by conventional techniques, such as primary or secondary alcohol functions, acid functions, amine functions, carbon-carbon double bonds, etc., as well as heteroatoms such as oxygen, nitrogen, sulfur and phosphorus. These heteroatoms have the role of interacting by their free doublets with the metallic cations of the salts in order to solvate them. They must be present in sufficient number to permit their displacement through the entire system. The polymers or oligomers used in the invention are selected from among those in which the ratio of the number of carbon atoms to the number of heteroatoms is between 1 and 12.

It is particularly advantageous, in accordance with the present invention, to combine different heteroatoms such as oxygen and nitrogen, as in the case of the oxyethylated polyamines.

In accordance with the present invention, polymers or oligomers having glass transition temperatures which are as low as possible are used. This characteristic can be advantageously obtained by mixing two or more polymers, if necessary, in accordance with customary techniques. Sequenced copolymers with short sequences or grafted copolymers with short lateral grafts or else linear or grafted statistical copolymers are particularly preferred.

The ionizable salts used in the invention are salts of alkali metals such as lithium, sodium, potassium, rubidium or cesium. The anions associated with the metal cations in these salts are weak bases such as the anions $CF_3SO_3^-$; $AsF_6^-$, $PF_6^-$, $ClO_4^-$, $SCN^-$, $I^-$, $Br^-$, $(C_6H_5)_4B^-$ as well as its derivatives, $BF_4^-$, $BCl_4^-$, $R-C_6H_4SO_3^-$ as well as its derivatives, and the organic-inorganic anion $O=P(OR)_2O^-$ as well as its derivatives, substituted by sulfur in various manners.

The new cross-linked elastomeric complex materials of ionic conduction of the present invention are prepared by dissolving a suitable amount of the ionizable salt in the base polymer or oligomer and then, when the polymer-salt system is homogeneous, cross-linking it in accordance with customary techniques.

The ionizable salt is dissolved in such an amount that the ratio of the number of metal cations to the number of heteroatoms charged with solvating them is between 1 and 30% and preferably between 5 and 10%. This ratio can be varied within the above-indicated limits as a function of the contemplated use temperature and of the desired modulus of elasticity of the material. A salt concentration higher than the above-indicated limit does not make it possible to obtain a satisfactory ionic conductivity due to interaction with the dipoles of the macromolecular network assuring the solvation, which becomes very great and tends to congeal the system. Conversely, a concentration of less than 1% does not make it possible to obtain sufficient results.

If necessary, the dissolving of the salt can be facilitated by the presence of a solvent, which is then eliminated by evaporation.

The cross linking is easily effected when the base polymers used bear, in particular groupings of primary or secondary alcohols and primary amines, by means of di-, tri- or poly-isocyanate catalyzed, for instance, by tin dibutyl dilaurate. However, any customary method of cross linking can be employed, for instance by means of acid dichlorides, acid anhydrides, diepoxides, etc.

The degree of cross linking is controlled by known techniques in order to obtain the cross linking density which produces the best ionic conductivity, with due consideration of the desired modulus of elasticity at the operating temperature, knowing that the ionic conductivity decreases with the cross-linking density while the modulus of elasticity increases. Too high a cross linking density may improve the mechanical strength but it results in an increase in the glass transition temperature and must therefore be avoided.

The cross linking makes it possible to obtain a macroscopically isotropic macromolecular material which is stable at high temperatures with mixtures of solvating polymers which are incompatible with each other, the mixture of these polymers leading to a lower glass transition temperature. In order to obtain the highest ionic conductivity for a given ionizable salt at a given concentration it is advantageous, in accordance with the invention, to obtain the lowest possible glass transition temperature, as indicated above.

It should be noted that macromolecular structures, which are suitably selected as indicated above, combined with the ionizable salts specifically described above, in accordance with the present invention, make it possible to obtain ionic conductivities greater than $10^{-5}$ $(\Omega.cm)^{-1}$ at 100° C.

This result may appear unexpected since it was generally agreed in this field of the art that the fact of having a cross-linked network necessarily results in a strong decrease in the mobility of the ions, and that the introduction of ionizable salts into such a network must increase the interactions between the different components and contribute to congealing the system.

Furthermore, it was believed, in accordance with the known techniques, that the presence of linear macromolecules with solvating atoms or group of atoms was the necessary condition for obtaining a high ionic conductivity. On the contrary, in accordance with the present invention, the highest ionic conductivities are obtained with charged, cross-linked, three-dimensional networks, which retain good elasticity at the temperature at which the conductivity is measured. It is therefore noted that the combination of a solvating elastomeric network and of one or more salts constituting a charge which by ionization, supplies cations whose displacement permits the passage of electric current results in a very good ionic conductivity.

The characteristics of the materials in accordance with the invention which have been described above permit their use as solid electrolytes, in particular in electrochemical generators or in potentiometric measurement cells.

The following examples will serve to illustrate the invention without limiting its scope.

EXAMPLE 1

30 g of a propylene-polyoxide/ethylene-polyoxide trisequenced linear copolymer having a central propylene-polyoxide sequence of a molecular weight of 2200, such that the total percentage of ethylene oxide is 40% of the total, are mixed with 3 g of sodium tetraphenylboride in 10 ml of methylene chloride. 3.34 g of triphenylene methane triisocyanate are then introduced into the medium, and then $5 \times 10^{-2}$ ml of tin dibutyl dilaurate. The reaction mixture, after agitation, is then poured, under nitrogen, into a mold formed of two plates of glass separated by a Viton joint. After 24 hours of reaction at ordinary temperature, the membranes are set aside to dry under vacuum at 80° C. until they are of constant weight.

Conductivity
at 100° C. $\sigma = 1 \times 10^{-4}$ $(\Omega.cm)^{-1}$
at 50° C. $\sigma = 1 \times 10^{-5}$ $(\Omega.cm)^{-1}$
Modulus of elasticity: $45 \times 10^5$ Pa at $-25°$ C.

EXAMPLE 2

30 g of a propylene-polyoxide/ethylene-polyoxide linear trisequenced copolymer having a central propylene-polyoxide sequence, of a molecular weight of 8350, such that the percentage of ethylene polyoxide is 80% of the total, are mixed with 3 g of sodium tetraphenyl boride in 20 ml of methylene chloride. Subsequently, 0.88 g of triphenylmethane triisocyanate are introduced into the medium and then $5 \times 10^{-2}$ ml of tin dibutyl dilaurate. After agitation, the reaction mixture is then poured, under nitrogen, into a mold formed of two plates of glass separated by a Viton joint. After 24 hours of reaction at ordinary temperature, the membranes are set aside to dry under vacuum at 80° C. until constant weight.

Conductivity
at 100° C. $\sigma = 6 \times 10^{-4}$ $(\Omega cm)^{-1}$
at 50° C. $\sigma = 1 \times 10^{-4}$ $(\Omega cm)^{-1}$
Modulus of elasticity: $2 \times 10^5$ Pa at $-10°$ C.

EXAMPLE 3

30 g of a four-arm star polymer of a molecular weight of 1650 and having the formula $$\begin{array}{c} H-(OC_2H_4)_y-(O-C_3H_6)_x \\ H-(OC_2H_4)_y-(O-C_3H_6)_x \end{array} N-CH_2-CH_2-N \begin{array}{c} (C_3H_6O)_x-(C_2H_4-O)_yH \\ (C_3H_6-O)_x-(C_2H_4-O)_yH \end{array}$$

in which the total of the ethylene-polyoxide sequences represents 40% of the total, are mixed with 3 g of sodium tetraphenyl boride in 10 ml of ethylacetate. 6.1 g of hexamethylene diisocyanate are then introduced into the medium and then $5 \times 10^{-2}$ ml of tin dibutyl dilaurate. After agitation, the reaction mixture is then poured, under nitrogen, into a mold formed of two plates of glass separated by a Viton joint. After 24 hours of reaction at ordinary temperature, the membranes are set aside to dry under vacuum at 80° C. to constant weight.

Conductivity
  at 100° C.: $\sigma = 1 \times 10^{-5}$ $(\Omega.cm)^{-1}$
  at 50° C.: $\sigma = 5 \times 10^{-6}$ $(\Omega.cm)^{-1}$
Modulus of elasticity: $7 \times 10^5$ Pa at $-15°$ C.

EXAMPLE 4

30 g of a star polymer of a molecular weight of 1650 having four branches, of the formula:

$$\begin{array}{c} H-(OC_2H_4)_y-(OC_3H_6)_x \\ H-(OC_2H_4)_y-(OC_3H_6)_x \end{array} N\ CH_2-CH_2-N \begin{array}{c} (C_3H_6-O)_x-(C_2H_4-O)_yH \\ (C_3H_6-O)_x-(C_2H_4-O)_yH \end{array}$$

in which the total of the ethylene-polyoxide sequences representing 40% of the total, are mixed with 0.71 g of sodium thiocyanate in 10 ml of ethyl acetate. 6.1 g of hexamethylene diisocyanate are then introduced into the medium and then diisocyanate are then introduced into the medium and then $5 \times 10^{-2}$ ml of tin dibutyl dilaurate. After agitation, the reaction mixture is then poured, under nitrogen, into a mold formed of two plates of glass separated by a Viton joint. After 24 hours of reaction at ordinary temperature, the membranes are set aside to dry under vacuum at 80° C. to constant weight.

Conductivity at 100° C.: $\sigma = 1 \times 10^{-5}$ $(\Omega.cm)^{-1}$
Modulus of elasticity: $6 \times 10^5$ Pa at $-15°$ C.

EXAMPLE 5

30 g of a star polymer of molecular weight equal to 3400 having four branches, of the formula:

$$\begin{array}{c} H-(O-C_2H_4)_y-(O-C_3H_6)_x \\ H-(O-C_2H_4)_y-(O-C_3H_6)_x \end{array} N-CH_2-CH_2-N \begin{array}{c} (C_3H_6-O)_x-(C_2H_4-O)_yH \\ (C_3H_6-O)_x-(C_2H_4-O)_yH \end{array}$$

in which the total of the ethylene-polyoxide sequences represents 40% of the total, are mixed with 1.5 g of lithium trifluoromethane-sulfonate and 20 ml of ethyl acetate. 2.9 g of hexamethylene diisocyanate are then introduced into the medium and then $5 \times 10^{-2}$ ml of tin dibutyl dilaurate. After agitation, the reaction mixture is then poured, under nitrogen, into a mold formed of two plates of glass separated by a Viton joint. After 24 hours of reaction at ordinary temperature, the membranes are set aside to dry under vacuum at 80° C. to constant weight:

Conductivity at 100° C.: $1 \times 10^{-5}$ $(\Omega.cm)^{-1}$
Modulus of elasticity: $6 \times 10^6$ Pa at $-15°$ C.

EXAMPLE 6

30 g of a four branch star polymer having a molecular weight of 12000, of the formula $$\begin{array}{c} H-(OC_2H_4)_y-(O-C_3H_6)_x \\ H-(OC_2H_4)_y-(O-C_3H_6)_x \end{array} N-CH_2-CH_2-N \begin{array}{c} (C_3H_6-O)_x-(C_2H_4-O-)_yH \\ (C_3H_6-O)_x-(C_2H_4-O-)_yH \end{array}$$

in which all of the ethylene-polyoxide sequences together represent 70% of the total are mixed with 3 g of sodium tetraphenyl boride in 30 ml of ethyl acetate and 10 ml of acetonitrile. 0.85 g of hexamethylene diisocyanate are then introduced into the medium and then $5 \times 10^{-2}$ ml of tin dibutyl dilaurate. After agitation, the reaction mixture is then poured, under nitrogen, into a mold formed of two plates of glass separated by a Viton joint. After 24 hours of reaction at ordinary temperature, the membranes are set aside to dry, under vacuum, at 80° C. to constant weight.

Conductivity
  at 100° C.: $\sigma = 6 \times 10^{-4}$ $(\Omega.cm)^{-1}$
  at 50° C.: $\sigma = 9 \times 10^{-5}$ $(\Omega.cm)^{-1}$
Modulus of elasticity: $2 \times 10^5$ Pa at $-15°$ C.

EXAMPLE 7

2.5 g of propylene-polyoxide/ethylene-polyoxide linear trisequenced copolymer with central propylene-polyoxide sequence and a molecular weight of 2200 such that the percentage of ethylene oxide is 40% of the total are mixed with 0.27 g of sodium tetraphenyl boride in 25 ml of ethyl acetate for about 15 minutes. After addition of 9.5 ml of a solution of 0.21 g of nitrocellulose in ethyl acetate, the reaction medium is concentrated at ordinary pressure under nitrogen to about 10 ml. 0.30 ml of hexamethylene diisocyanate and $5 \times 10^{-2}$ of tin dibutyl dilaurate are added at ordinary temperature.

After agitation, the reaction mixture is then poured under nitrogen into a mold formed of two plates of glass separated by a Viton joint. After 24 hours of reaction at ordinary temperature, the membranes are set aside to dry under vacuum at 50° C. to constant weight.

Conductivity $5 \times 10^{-5}$ $(\Omega.cm)^{-1}$ at 100° C.
Modulus of elasticity: $10^5$ Pa at 20° C.

EXAMPLE 8

10 g of ethylene diol polyoxide, of a molecular weight of 400, are mixed with 2.68 g of sodium tetraphenylboride in 7 cm$^3$ of methylene chloride. Subsequently 6.12 g of triphenylmethane triisocyanate are introduced into the medium, then $5 \times 10^{-2}$ cm$^3$ of tin dibutyl dilaurate. After agitation, the reaction mixture is then poured under nitrogen into a mold formed of two plates of glass separated by a Viton joint. After 24 hours of reaction at ordinary temperature, the membranes are set aside to dry under vacuum at 80° C. until constant weight.

Conductivity
at 100° C.$\sigma = 2.0 \times 10^{-6}$ $(\Omega.cm)^{-1}$
at 70° C.$\sigma = 7.9 \times 10^{-8}$ $(\Omega.cm)^{-1}$
Modulus of elasticity at 20° C.: $5.0 \times 10^5$ Pa.

EXAMPLE 9

10 g of ethylene diol polyoxide, having a molecular weight of 600, are mixed with 2.68 g of sodium tetraphenylboride in 7 cm$^3$ of methylene chloride. Subsequently, 4.08 g of triphenyl methane triisocyanate are introduced into the medium, then $5 \times 10^{-2}$ cm$^3$ of tin dibutyl dilaurate. After agitation, the reaction mixture is then poured, under nitrogen, into a mold formed of two plates of glass separated by a Viton joint. After 24 hours of reaction at ordinary temperature, the membranes are set aside to dry under vacuum at 80° C. until constant weight.

Conductivity
at 100° C.$\sigma = 1.0 \times 10^{-5}$ $(\Omega.cm)^{-1}$
at 70° C.$\sigma = 2.0 \times 10^{-6}$ $(\Omega.cm)^{-1}$
Modulus of elasticity at 20° C.: $3.7 \times 10^5$ Pa

EXAMPLE 10

10 g of ethylene diol polyoxide, having a molecular weight of 1000, are mixed with 2.68 g of sodium tetraphenylboride in 7 cm$^3$ of methylene chloride. Subsequently, 2.45 g of triphenyl methane triisocyanate are introduced into the medium, then $5 \times 10^{-2}$ cm$^3$ of tin dibutyl dilaurate. After agitation, the reaction mixture is then poured, under nitrogen, into a mold formed of two plates of glass separated by a Viton joint. After 24 hours of reaction at ordinary temperature, the membranes are set aside to dry under vacuum at 80° C. until constant weight.

Conductivity
at 100° C.$\sigma = 2.5 \times 10^{-5}$ $(\Omega.cm)^{-1}$
at 70° C.$\sigma = 5.0 \times 10^{-6}$ $(\Omega.cm)^{-1}$
Modulus of elasticity at 20° C.: $2.0 \times 10^5$ Pa

EXAMPLE 11

10 g of ethylene diol polyoxide, having a molecular weight of 1500, are mixed with 2.68 g of sodium tetraphenylboride in 7 cm$^3$ of methylene chloride. Subsequently, 1.64 g of triphenyl methane triisocyanate are introduced into the medium, then $5 \times 10^{-2}$ cm$^3$ of tin dibutyl dilaurate. After agitation, the reaction mixture is then poured, under nitrogen, into a mold formed of two plates of glass separated by a Viton joint. After 24 hours of reaction at ordinary temperature, the membranes are set aside to dry under vacuum at 80° C. until constant weight.

Conductivity
at 100° C.$\sigma = 1.3 \times 10^{-4}$ $(\Omega.cm)^{-1}$
at 70° C.$\sigma = 3.2 \times 10^{-5}$ $(\Omega.cm)^{-1}$
Modulus of elasticity at 20° C.: $1.7 \times 10^5$ Pa

EXAMPLE 12

10 g of ethylene diol polyoxide having a molecular weight of 3000, are mixed with 2.68 g of sodium tetraphenylboride in 7 cm$^3$ of methylene chloride. Subsequently, 0.82 g of triphenyl methane triisocyanate are introduced into the medium, then $5 \times 10^{-2}$ cm$^3$ of tin dibutyl dilaurate. After agitation, the reaction mixture is then poured, under nitrogen, into a mold formed of two plates of glass separated by a Viton joint. After 24 hours of reaction at ordinary temperature, the membranes are set aside to dry under vacuum at 80° C. until constant weight.

Conductivity
at 100° $\sigma = 1.6 \times 10^{-4}$ $(\Omega.cm)^{-1}$
at 70° $\sigma = 4.0 \times 10^{-5}$ $(\Omega.cm)^{-1}$
Modulus of elasticity at 20° C.: $5.0 \times 10^5$ Pa

EXAMPLE 13

10 g of ethylene diol polyoxide, having a molecular weight of 3000, are mixed with 0.42 g of lithium tetraphenylboride in 7 cm$^3$ of methylene chloride. Subsequently, 0.82 g of triphenyl methane triisocyanate are introduced into the medium, then $5 \times 10^{-2}$ cm$^3$ of tin dibutyl dilaurate. After agitation, the reaction mixture is then poured, under nitrogen, into a mold formed of two plates of glass separated by a Viton joint. After 24 hours of reaction at ordinary temperature, the membranes are set aside to dry under vacuum at 80° C. until constant weight.

Conductivity
at 100° $\sigma = 4.0 \times 10^{-5}$ $(\Omega.cm)^{-1}$
at 70° $\sigma = 1.6 \times 10^{-5}$ $(\Omega.cm)^{-1}$
Modulus of elasticity at 20° C.: $5.0 \times 10^5$ Pa

EXAMPLE 14

10 g of ethylene diol polyoxide, having a molecular weight of 3000, are mixed with 0.8 g of lithium perchlorate in 7 cm$^3$ of methylene chloride. Subsequently, 0.82 g of triphenyl methane triisocyanate are introduced into the medium, then $5 \times 10^{-2}$ cm$^3$ of tin dibutyl dilaurate. After agitation, the reaction mixture is then poured, under nitrogen, into a mold formed of two plates of glass separated by a Viton joint. After 24 hours of reaction at ordinary temperature, the membranes are set aside to dry under vacuum at 80° C. until constant weight.

Conductivity
at 100° $\sigma = 4.0 \times 10^{-4}$ $(\Omega.cm)^{-1}$
at 70° $\sigma = 1.6 \times 10^{-4}$ $(\Omega.cm)^{-1}$
Modulus of elasticity at 20° C.: $5.0 \times 10^5$ Pa

EXAMPLE 15

10 g of ethylene diol polyoxide, having a molecular weight of 1000, are mixed with 0.8 g of lithium perchlorate in 7 cm$^3$ of methylene chloride. Subsequently, 2.45 g of triphenyl methane triisocyanate are introduced into the medium, then $5 \times 10^{-2}$ cm$^3$ of tin dibutyl dilaurate. After agitation, the reaction mixture is then poured, under nitrogen, into a mold formed of two plates of glass separated by a Viton joint. After 24 hours of reaction at ordinary temperature, the membranes are set aside to dry under vacuum at 80° C. until constant weight.

Conductivity
at 100° $\sigma = 1.6 \times 10^{-4}$ $(\Omega.cm)^{-1}$
at 70° $\sigma = 5.0 \times 10^{-5}$ $(\Omega.cm)^{-1}$
Modulus of elasticity at 20° C.: $2.0 \times 10^5$ Pa

EXAMPLE 16

10 g of polytetrahydrofurane diol, having a molecular weight of 1000, are mixed with 0.8 g of lithium perchlorate in 7 cm$^3$ of methylene chloride. Subsequently, 2.45 g of triphenyl methane triisocyanate are introduced into the medium, then $5 \times 10^{-2}$ cm$^3$ of tin dibutyl dilaurate. After agitation, the reaction mixture is then poured, under nitrogen, into a mold formed of two plates of glass separated by a Viton joint. After 24 hours of reaction at ordinary temperature, the membranes are set aside to dry under vacuum at 80° until constant weight.

Conductivity
at 100° C.$\sigma = 7.9 \times 10^{-6}$ $(\Omega.cm)^{-1}$
at 70° C.$\sigma = 2.0 \times 10^{-6}$ $(\Omega.cm)^{-1}$
Modulus of elasticity at 20° C.: $2.0 \times 10^6$ Pa

EXAMPLE 17

10 g of propylene diol polyoxide, having a molecular weight of 400, are mixed with 2 g of sodium tetraphenylboride in 7 cm$^3$ of methylene chloride. Subsequently, 6.12 g of triphenyl methane triisocyanate are introduced into the medium, then $5 \times 10^{-2}$ cm$^3$ of tin dibutyl dilaurate. After agitation, the reaction mixture is then poured, under nitrogen, into a mold formed of two glass plates separated by a Viton joint. After 24 hours of reaction at ordinary temperature, the membranes are set aside to dry under vacuum at 80° C. until constant weight.

Conductivity
at 100° C.$\sigma = 2.0 \times 10^{-7}$ $(\Omega.cm)^{-1}$
at 70° C.$\sigma = 1.0 \times 10^{-8}$ $(\Omega.cm)^{-1}$
Modulus of elasticity at 20° C.: $1.0 \times 10^8$ Pa

EXAMPLE 18

10 g propylene diol polyoxide, having a molecular weight of 1000, are mixed with 2 g of sodium tetraphenylboride in 7 cm$^3$ of methylene chloride. Subsequently, 2.45 g of triphenyl methane triisocyanate are introduced into the medium, then $5 \times 10^{-2}$ cm$^3$ of tin dibutyl dilaurate. After agitation, the reaction mixture is then poured, under nitrogen, into a mold formed of two plates of glass separated by a Viton joint. After 24 hours of reaction at ordinary temperature, the membranes are set aside to dry under vacuum at 80° C. until constant weight.

Conductivity
at 100° C.$\sigma = 1.0 \times 10^{-5}$ $(\Omega.cm)^{-1}$
at 70° C.$\sigma = 1.3 \times 10^{-6}$ $(\Omega.cm)^{-1}$
Modulus of elasticity at 20° C.: $5.0 \times 10^5$ Pa

EXAMPLE 19

10 g of propylene diol polydioxide, having a molecular weight of 2000, are mixed with 2 g of sodium tetraphenylboride in 7 cm$^3$ of methylene chloride. Subsequently, 1.23 g of triphenyl methane triisocyanate are introduced into the medium, then $5 \times 10^{-2}$ cm$^3$ of tin dibutyl dilaurate. After agitation, the reaction mixture is then poured, under nitrogen, into a mold formed of two plates of glass separated by a Viton joint. After 24 hours of reaction at ordinary temperature, the membranes are set aside to dry under vacuum at 80° C. until constant weight.

Conductivity
at 100° C.$\sigma = 1.0 \times 10^{-4}$ $(\Omega.cm)^{-1}$
at 70° C.$\sigma = 1.0 \times 10^{-5}$ $(\Omega.cm)^{-1}$
Modulus of elasticity at 20° C.: $4.0 \times 10^5$ Pa

EXAMPLE 20

10 g of propylene triol polyoxide having a molecular weight of 1500, are mixed with 2 g of sodium tetraphenylboride in 7 cm$^3$ of methylene chloride. Subsequently, 1.7 g of hexamethylene diisocyanate are introduced into the medium, then $5 \times 10^{-2}$ cm$^3$ of tin dibutyl dilaurate. After agitation, the reaction mixture is then poured, under nitrogen, into a mold formed of two plates of glass separated by a Viton joint. After 24 hours of reaction at ordinary temperature, the membrane are set aside to dry under vacuum at 80° C. until constant weight.

Conductivity
at 100° C.$\sigma = 3.2 \times 10^{-5}$ $(\Omega.cm)^{-1}$
at 70° C.$\sigma = 5.0 \times 10^{-6}$ $(\Omega.cm)^{-1}$
Modulus of elasticity at 20° C.: $5.0 \times 10^5$ Pa

EXAMPLE 21

7.5 g of propylene diol polyoxide, having a molecular weight of 1000, and 5 g of propylene triol polyoxide, having a molecular weight of 1500, are mixed with 2.5 g of sodium tetraphenylboride in 7 cm$^3$ of methylene chloride. Subsequently, 2.1 of hexamethylene diisocyanate are introduced into the medium, then $5 \times 10^{-2}$ cm$^3$ of tin dibutyl dilaurate. After agitation, the reaction mixture is then poured, under nitrogen, into a mold formed of two plates of glass separated by a Viton joint. After 24 hours of reaction at ordinary temperature, the membranes are set aside to dry under vacuum at 80° C. until constant weight.

Conductivity
at 100° C.$\sigma = 4.0 \times 10^{-5}$ $(\Omega.cm)^{-1}$
at 70° C.$\sigma = 1.3 \times 10^{-5}$ $(\Omega.cm)^{-1}$
Modulus of elasticity at 20° C.: $2.0 \times 10^5$ Pa

EXAMPLE 22

10 g of a linear trisequenced polymer of ethylene propylenepolyoxide, having a propylene polyoxide central sequence, having a molecular weight of 8350, such that the percentage of ethylene polyoxide be 80% of the total, are mixed with 1.2 g of lithium perchlorate in 7 cm$^3$ of methylene chloride. Subsequently, 0.39 g of aliphatic triisocyanate are introduced into the mixture, then $5 \times 10^{-2}$ cm$^3$ of tin dibutyl dilaurate. After agitation, the reaction mixture is then poured, under nitrogen, into a mold formed of two plates of glass separated by a Viton joint. After 24 hours of reaction at ordinary temperature, the membranes are set aside to dry under vacuum at 80° C. until constant weight.

Conductivity
at 100° C.$\sigma = 1.6 \times 10^{-3}$ $(\Omega.cm)^{-1}$
at 70° C.$\sigma = 8.5 \times 10^{-4}$ $(\Omega.cm)^{-1}$
Modulus of elasticity at 20° C.: $1.0 \times 10^5$ Pa

EXAMPLE 23

10 g of ethylene diol polyoxide, having a molecular weight of 600, and 3.9 g of ethylene diol polyoxide, having a molecular weight of 150, and 0.67 g of trimethyl propanol are mixed with 2 g of sodium tetraphenylboride in 7 cm$^3$ of methylene chloride. Subsequently, 8.4 g of hexamethylene diisocyanate are introduced into the mixture, then $5 \times 10^{-2}$ cm$^3$ of tin dibutyl dilaurate. After agitation, the reaction mixture is then poured, under nitrogen, into a mold formed of two plates of glass separated by a Viton joint. After 24 hours of reaction at ordinary temperature, the membranes are set aside to dry under vacuum at 80° C. until constant weight.

Conductivity at 100° C. $\sigma = 4.0 \times 10^{-5}$ $(\Omega.cm)^{-1}$ at 70° C. $\sigma = 1.0 \times 10^{-5}$ $(\Omega.cm)^{-1}$ Modulus of elasticity at 20° C.: $1.7 \times 10^6$ Pa

We claim:

1. A solid electrolyte constituted by a macromolecular material of ionic conduction, characterized by the fact that it is formed of cross-linked polymers or oligomers containing heteroatoms in the monomer unit or in side chains as well as cross-linkable functions and containing one or more ionizable salts and having a glass transition temperature as low as possible.

2. A solid electrolyte according to claim 1, characterized by the fact that the heteroatoms are selected from among nitrogen, oxygen, sulfur and phosphorus.

3. A solid electrolyte according to claim 2, characterized by the fact that the ratio of the number of carbon atoms to the number of heteroatoms in the polymer or oligomer is between 1 and 12.

4. A solid electrolyte according to any of claims 1 to 3, characterized by the fact that it is formed from a mixture of several polymers or oligomers.

5. A solid electrolyte according to claim 1, characterized by the fact that the ionizable salts are salts of alkali metals, selected from among the salts of lithium, sodium, potassium, rubidium or cesium.

6. A solid electrolyte according to claim 5, characterized by the fact that the anion associated with the metallic cation in the salt is selected from among $CF_3SO_3^-$, $AsF_6^-$, $PF_6^-$, $ClO_4^-$, $SCN^-$, $I^-$, $Br^-$, $(C_6H_5)_4B^-$ as well as its derivatives, $BF_4^-$, $BCl_4^-$, $R-C_6H_4SO_3^-$ as well as its derivatives, and the organo-inorganic anion $O=P(OR)_2O^-$ as well as its derivatives variously substituted by sulfur.

7. A solid electrolyte according to either of claims 5 and 6, characterized by the fact that the ratio of the number of metal cations to the number of heteroatoms in the polymer or oligomer is between 1 and 30%.

8. A solid electrolyte according to any of claims 1, 2, 3, 5 and 6, characterized by the fact that the polymers or oligomers are sequenced or grafted statistical copolymers or sequenced or grafted polycondensates derived from cyclic ethers, formaldehyde, acetaldehyde, aziridines or ethylene diamine.

9. A solid electrolyte according to claim 8, characterized by the fact that the polymer is a propylene-polyoxide/ethylene-polyoxide copolymer or an oxyethylated polyamine.

* * * * *